July 11, 1967 T. A. BANNING, JR 3,330,906

RADIO AND TELEVISION OPERATION

Original Filed July 16, 1956 4 Sheets-Sheet 1

Inventor:

Thos. A. Banning, Jr.

RADIO AND TELEVISION OPERATION

Original Filed July 16, 1956 4 Sheets-Sheet 2

Inventor:

Thos. A. Banning Jr.

Inventor:
Thos. A. Banning, Jr.

Inventor:
Thos. A. Banning, Jr.

3,330,906
RADIO AND TELEVISION OPERATION

Thomas A. Banning, Jr., 5500–5520 S. Shore Drive, Apt. 1408, Chicago, Ill. 60637

Application Dec. 17, 1962, Ser. No. 245,277, which is a division of application Ser. No. 597,950, July 16, 1956, now Patent No. 3,070,652, dated Dec. 25, 1962. Divided and this application Aug. 2, 1963, Ser. No. 299,559
11 Claims. (Cl. 178—5.4)

Figure 1:
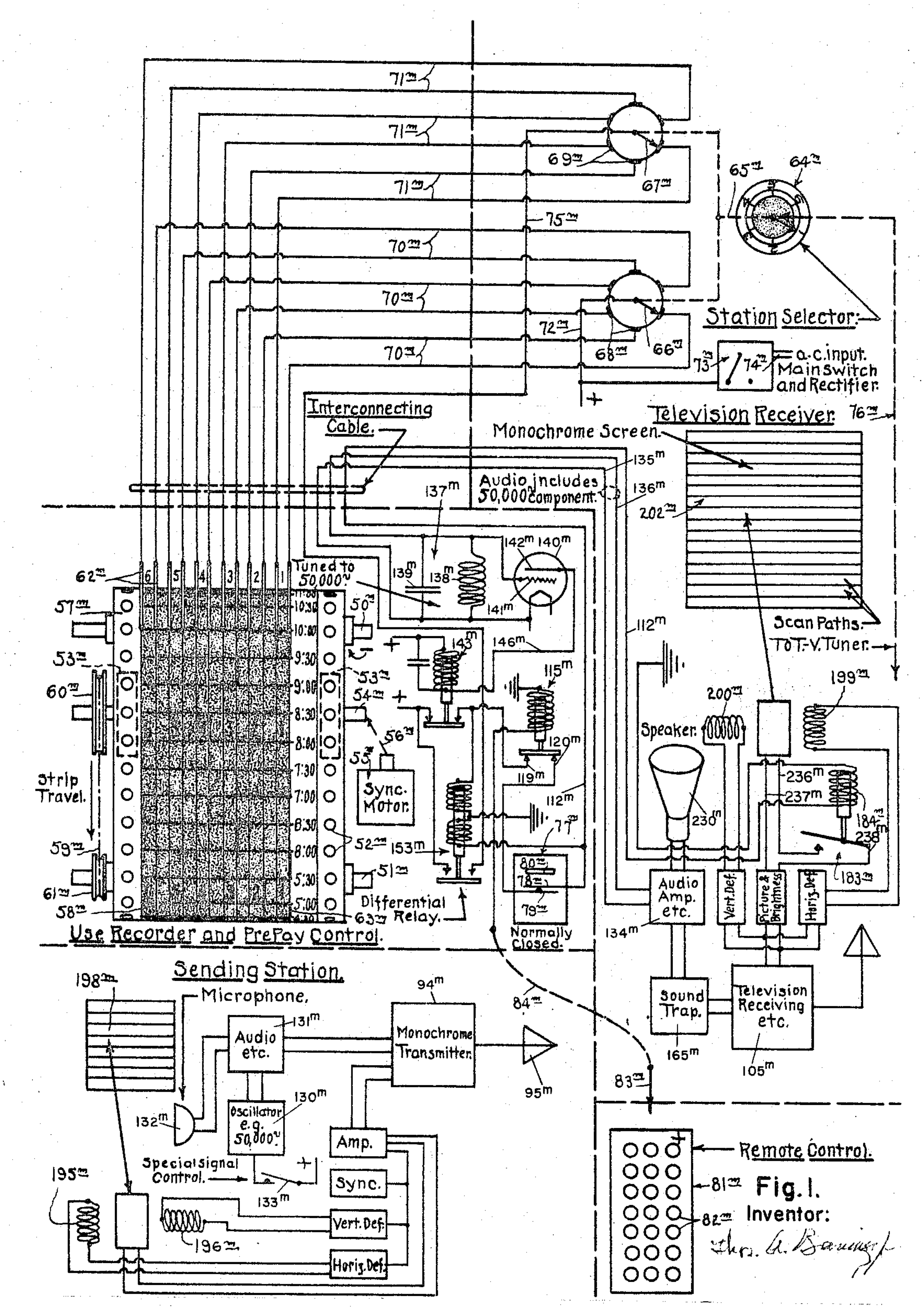

This application is a division of my co-pending application for Letters Patent of the United States, Ser. No. 245,277, filed Dec. 17, 1962, as a division of my earlier application for Letters Patent of the United States, Ser. No. 597,950, filed July 16, 1956, and issued as Letters Patent No. 3,070,652 on Dec. 25, 1962, each of such applications being titled, Improvements in Radio and Television Program Selecting, and Time of Use Recording. Said application, Ser. No. 597,950 was co-pending with my earlier application, Ser. No. 235,854, filed July 19, 1951, and issued as Letters Patent, No. 2,755,334, on July 17, 1956. Said application, Ser. No. 235,854, Patent No. 2,755,334, discloses means for receiving and interpreting received signals which include picture signals, as a translation in either of two grades of excellence, with provision whereby the viewer or operator may select either of such translations; together with means to make operative the translating means for one of the grades of reception and translation, only when such grade of reception is authorized by pre-pay operation or by remote control operation.

This invention relates to Improvements in Pre-Pay or Subscription Radio and Television Operation, and the like. More particularly the improvements hereinafter illustrated and described concern themselves with television and audio reception, and the means to produce such reception, whereby certain programs being emitted from the sending station, may be received by conventional operations of translation of the received signals under conditions which will produce both picture translation and audio translation of the picture and audio components of the program as fully intelligible translations under acceptable excellence; or under conditions which will produce one of the two above defined components as a fully intelligible translation of acceptable excellence, but will either fail completely to produce the other of such defined components, so that one component is intelligibly translated, or will produce the translation of such other component under non-acceptable conditions of translation, or under reduced quality of reception of such other component.

Conveniently, the embodiments hereinafter disclosed are such that the audio component is translated as a fully intelligible and acceptable translation, but the picture component is either blanked out or rendered un-acceptable; or is rendered in a translation of reduced quality. In the latter case (picture component rendered in a translation of reduced quality, but nevertheless acceptable), the higher quality reception may be as a full color translation, whereas the reduced quality translation may be in monochrome; but in either case, the embodiments herein disclosed are such that the audio component will be translated in its intended high quality.

Specifically, the improvements herein disclosed include means to enable reception of the program emitted by the sending station under the condition that both the picture component and the audio component are translated as acceptable translations of high quality when the program is of what may be termed "ordinary" quality, without the need of pre-pay or other special payment or credit operation. However, when the program is what may be called a "special" program, the arrangements are such that, as shown in one embodiment, reception may be made under the condition that the picture component is either blanked out completely so that no picture component is shown, or, alternatively, as shown in another embodiment, the reception will be translated such that the picture component is of reduced quality reception (e.g., monochrome instead of full color), without pre-pay or other special payment or credit operation, but when pre-pay or other special payment or credit operation is made the translation will be in full color.

In connection with the foregoing objectives, it is a further object to make provision for producing a recording of the times when any of such "special" programs are tuned by the observer, whether such programs comprise television alone, or with accompanying audio. Such recording will enable proper distribution of payments thus paid, or credit operations thus produced, to be distributed among numerous sponsors of the "special" programs, thus also simplifying auditing and related operations and rendering such operations truly dependable.

Other objects and uses of the invention will appear from a detailed description of the same, which consists in the features of construction and combinations of parts hereinafter described and claimed.

Figure 2:
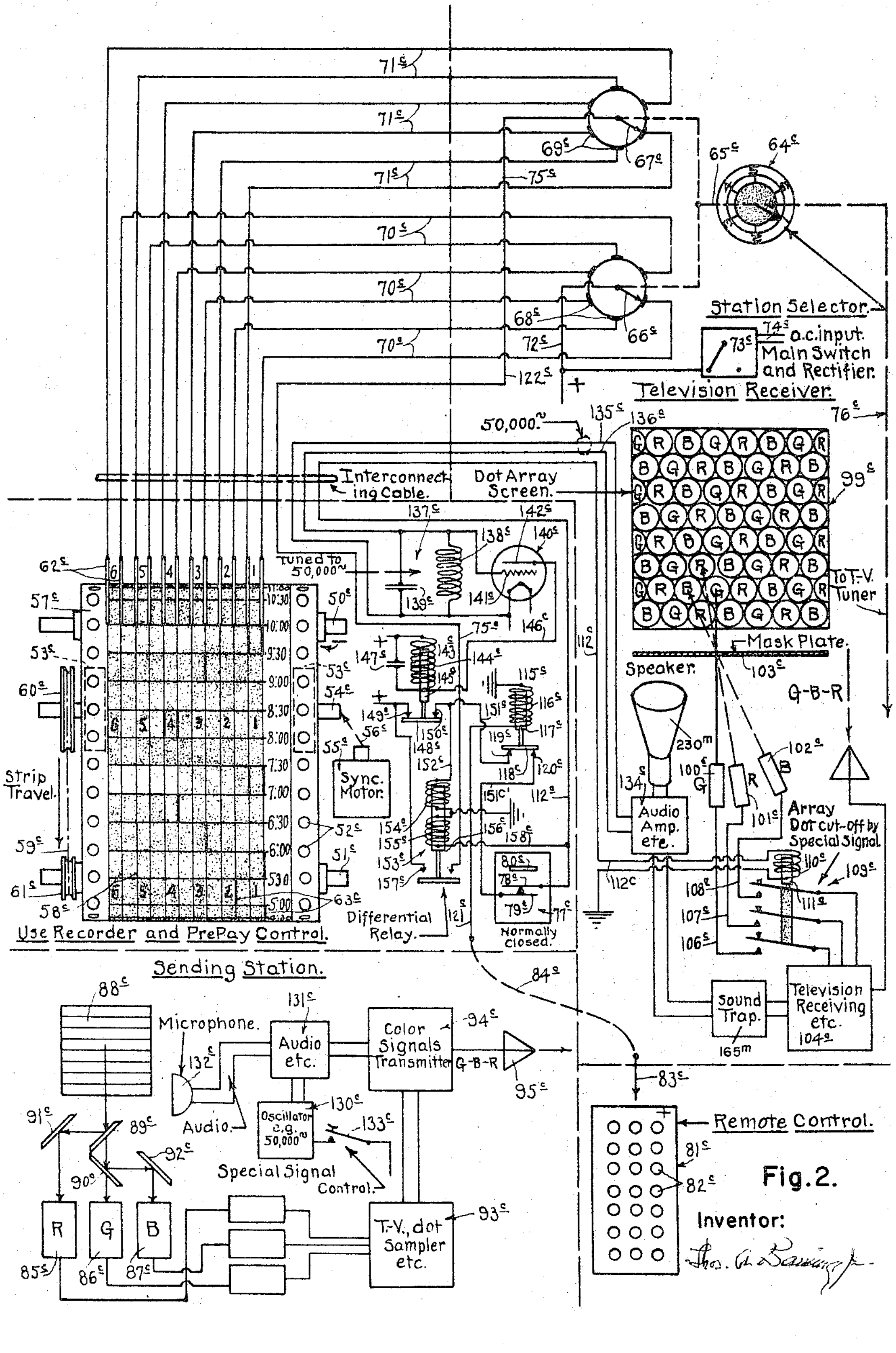
Figure 3:
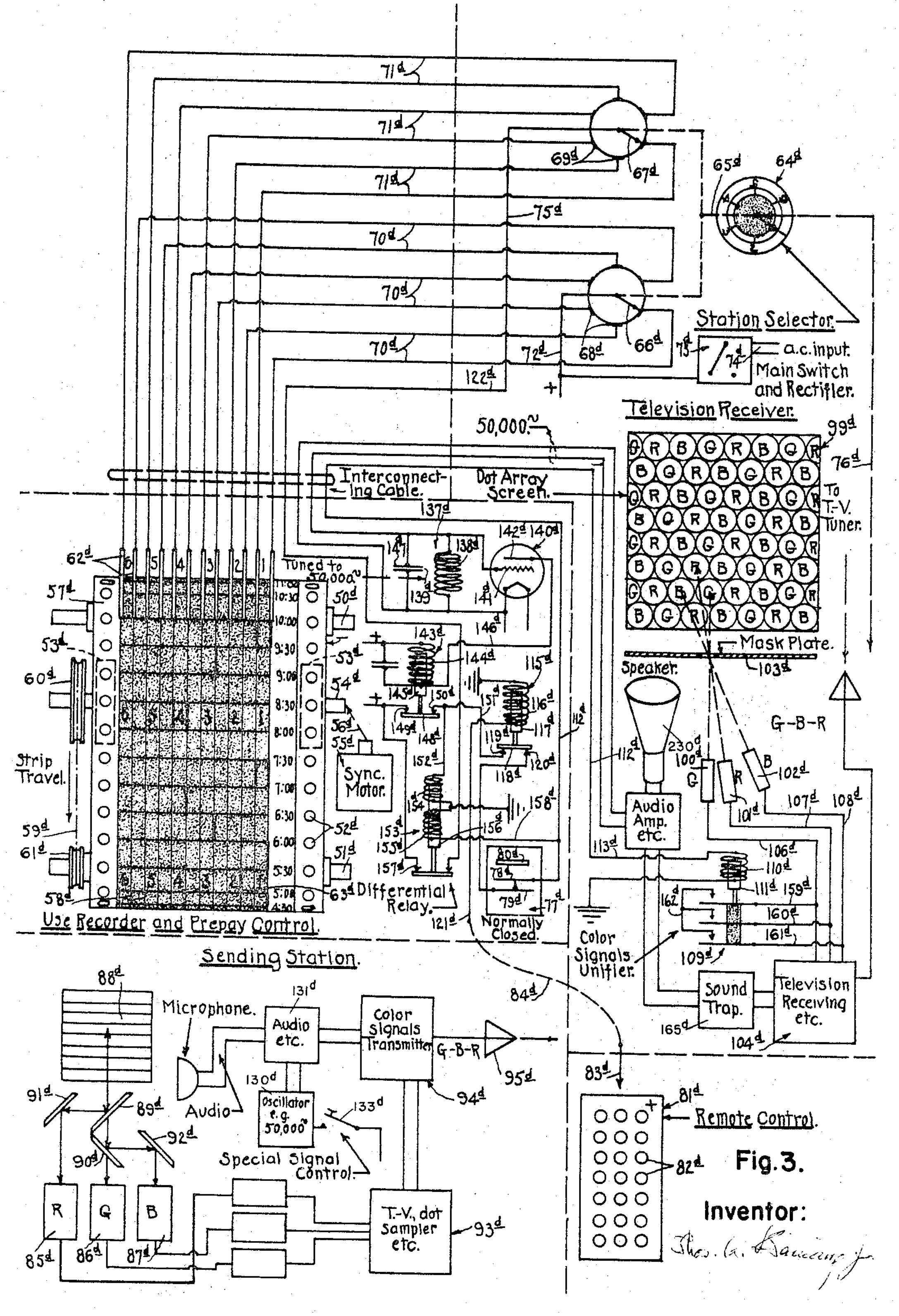
Figure 4:
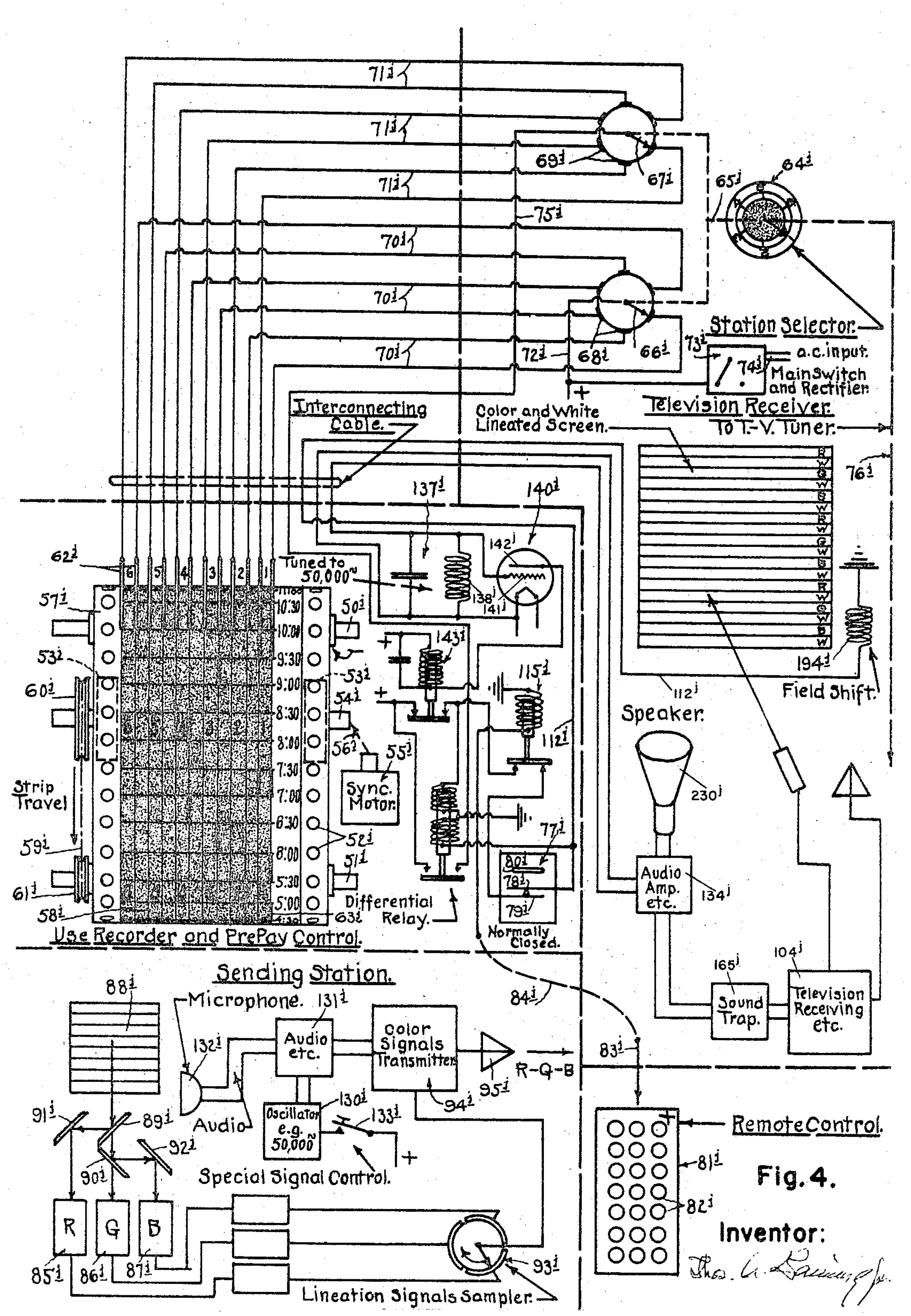

In the drawings:

FIGURE 1 shows an embodiment comprising provision for both picture signal reception and translation, and for audio signal reception for the speaker, together with provision for discontinuing the picture translation completely upon reception of a control signal therefor; together with means to make ineffective such picture translation discontinuance upon pre-pay or remote control operation, to restore the picture component of the reception; the embodiment shown in this figure specifically showing a single gun, monochrome translating means;

FIGURE 2 shows an embodiment similar to that shown in FIGURE 1; but the embodiment shown in FIGURE 2 is for a conventional three dot color array color picture translation, including three electron guns, and also including provision for audio signal reception and translation; and this embodiment includes provision for open-circuiting such guns or otherwise discontinuing their functions upon reception of a control signal therefor, together with means to make ineffective such gun open-circuit operation upon making pre-pay or remote control operation, to restore the reception and translation of the picture component;

FIGURE 3 shows an embodiment similar to that shown in FIGURE 2; but in the embodiment of FIGURE 3 provision is made for producing monochrome translation of the picture from the received picture signals, when the control signal is received; and for discontinuing such monochrome picture translation upon making pre-pay or remote control operation, to restore the color picture translation operation; and FIGURE 4 shows an embodiment including provision for producing linear scans of the excitable target of the kinescope, for production of linear color scans, with further provision for producing white linear scans between successive color lineations, to enable translation of the picture either as a color translation or as a monochrome translation, by slightly shifting the "frame" produced by the two fields of scans; together with means to cause frame shift to the white linear scans position when a control signal is received, and for discontinuing such frame shift when pre-pay or remote control operation is produced to restore the color translation.

Referring first to FIGURE 1, in this embodiment provision has been made for emitting both picture signals and audio signals, and for receiving and translating both sets of signals according to conventional processes, to produce a monochrome translation of the received picture signals, and a speaker translation of the received audio signals. Provision has also been made in this embodiment for emitting a control signal. Such control signal may be emitted in convenient manner, synchronously with the emission of the "special" program picture and/or audio signals, to effect and control the receiver operations incident to the reception and translation of the emitted signals for such "special" program. In the specific showing of FIGURE 1 (and also the FIGURES 2, 3 and 4) such control signal is emitted from the sending station, as a super-sonic signal injected into the stream of signals carrying the picture and audio components; and at the receiving station provision has been made for separating such super-sonic control signal from the stream of received signals, all according to principles fully described and illustrated in said original application, Ser. No. 597,950 (Patent No. 3,070,652), and in said application, Serial No. 245,277, filed Dec. 17, 1962. Accordingly it is unnecessary to describe the elements and circuitry shown in FIGURE 1 (and the other figures of this case), provided for responding to such control signal, when received, and for effecting the collateral operations presently to be described in detail. The following operations are, however stated for convenience of understanding the control operations related to the pre-pay or remote control functions, namely:

When the switch $\mathbf{133}^m$ is closed (shown located at the sending station), the oscillator $\mathbf{130}^m$ is activated to deliver the control signal (e.g., 50,000 c.p.s.) into the stream of audio signals, through the unit $\mathbf{131}^m$ and the unit $\mathbf{94}^m$, to the antenna $\mathbf{95}^m$. Such switch $\mathbf{133}^m$ is thus provided for starting and stopping the emission of such control signal during the intervals when "special" programs are being emitted, and for extinguishing such control signal during intervals when "ordinary" programs are being emitted.

At the receiver there is provided an oscillator $\mathbf{137}^m$ which is tuned to the frequency of such control signal, and thus will respond to reception of the control signal by the receiver, only when such control signal is being emitted. Such resonant response of the oscillator $\mathbf{137}^m$ to the received control signal causes response of the tube $\mathbf{140}^m$ with activation of the plate $\mathbf{142}^m$ and corresponding response of the relay $\mathbf{143}^m$ to close its contacts, thus supplying potential to the left-hand contact $\mathbf{119}^m$ of the relay $\mathbf{115}^m$, which relay is normally in its closed contact position as illustrated. The contacts of the coin-box or like unit $\mathbf{77}^m$ are normally closed, as shown in the figure, so that the line $\mathbf{112}^m$ leading to the solenoid of the relay or switch element, $\mathbf{184}^m$ is electrified to cause such switch to open its contacts and thus open the circuit over which the signals for the electron beam for signal translation, are delivered. Therefore as long as the control signal is being emitted and is received by the receiver in question, the picture signals for the picture component are discontinued and picture translation is prevented. However, either pre-pay by use of the unit $\mathbf{77}^m$, or remote control by plugging the element $\mathbf{83}^m$ into one of the sockets $\mathbf{82}^m$ of the remote control unit, will discontinue supply of current over the line $\mathbf{112}^m$ to such switch element $\mathbf{184}^m$, so that the picture translation will then be restored.

The recording means to produce records of stations tuned by the receiver, including records of the tuning of stations from which "special" programs are being received, are included in the showings of FIGURE 1. Such recordings and the means to produce them, are fully illustrated and described in said earlier patent, No. 3,070,652; and said earlier application, Ser. No. 245,277; in combination with the control signal responding and operational elements shown in FIGURE 1 of this case. Accordingly, it is unnecessary to repeat such detailed descriptions here.

In FIGURE 2 I have shown elements and operational combinations and circuitry similar to the showings of FIGURE 1, with the difference that the showings of the sending station for production and emittion of the picture signals, are for the emission of color signals instead of monochrome signals; and with the corresponding difference that the receiver equipment shown in FIGURE 2 is for the reception and translation of the color picture signals to produce a raster in color, instead of in monochrome. Accordingly, it is unnecessary to describe the showing of FIGURE 2 in full detail; but the following elements shown in FIGURE 2 are specially noted, namely:

The switch $\mathbf{109}^c$ which controls delivery or stoppage of signals to the three guns $\mathbf{100}^c$, $\mathbf{101}^c$ and $\mathbf{102}^c$ includes the three pairs of contacts, $\mathbf{106}^c$, $\mathbf{107}^c$ and $\mathbf{108}^c$, all under control and operation of the solenoid $\mathbf{110}^c$ which connects to the line $\mathbf{112}^c$. Said line $\mathbf{112}^c$ corresponds to the same line $\mathbf{112}^m$ of FIGURE 1, so that its electrification under control of the control signal elements, and the pre-pay and remote control elements, will be understood from earlier explanations respecting FIGURE 1.

Reference to FIGURE 3 discloses another embodiment which includes provision in the sending station for emission of color signals, and audio signals, and the control signal, as in FIGURE 2. FIGURE 3 also includes the provision for receiving and translating the color signals by use of a three gun arrangement, and for receiving and translating the audio signals, including the speaker. However, in the present embodiment the switch unit which controls the three guns includes the three movable contacts $\mathbf{159}^d$, $\mathbf{160}^d$ and $\mathbf{161}^d$ gang operated by the solenoid $\mathbf{110}^d$; but in the present embodiment provision has been made for ganging together the stationary contacts with which such movable contacts engage, such ganging being produced by the connection $\mathbf{162}^d$ with stationary contacts which are severally engaged by the movable contacts when such solenoid is energized by reception and translation of the control signal when the "special" program is being emitted. Thus, when the "special" program is emitted all three of the guns will be subjected to control of all three of the color signals, causing the three guns to produce electron beams which are the joint effects of all three color signals, at each of the dot array locations. The net effect will be production of white light sensations to the observer, and correspondingly, production of a monochrome translation. When, however, pre-pay or remote control operation is produced, the switch $\mathbf{159}^d$, $\mathbf{160}^d$ and $\mathbf{161}^d$ will be allowed to move back to its open-circuit position, with restoration of the conventional color translation.

In the embodiment shown in FIGURE 4, the kinescope screen is provided with linear scan positions adapted to deliver to the viewing of the observer, the three primary colors in progression, according to previously disclosed color screen translations shown in my earlier patent, No. 2,755,334, with intermediate white light producing lineations. Accordingly, when the sending station delivers linear scan signals based on scanning of the object with such an arrangement as shown at the send-station of FIGURE 4, a linearly scanned three color raster will be produced when the electron beam scans are registered with such three color producing lineations. In this kinescope screen as shown in FIGURE 4 there are also included the white light producing lineations, so that by shifting the "frame" of the translation either up or down an amount substantially equal to the distance, center to center, between succesive lineations, the translation will be produced as a monochrome translation. The calibration may be adjusted for scan of the color lineations under normal receiving and signal translating conditions. The solenoid $\mathbf{194}^j$ represents means to produce vertical shift of the scans so that the frame is produced with scanning of the white light producing lineations. Thus, by energizing such element $\mathbf{194}^j$ when the control signal is being emitted during emission of the color signals, the tranlation will be a monochrome translation, the line $\mathbf{112}^j$ connecting to one terminal of such element, with the other terminal thereof grounded as shown. Then, by pre-pay or remote control, the line 112j will be de-electrified, with termination of the shift of the picture frame, to restore such frame to the color producing lineations.

It is here noted that in my earlier patent, No. 2,755,334, no provision is shown for sound translation in the various embodiments therein shown, so that none of such embodiments includes the combination of the picture producing raster under the combination thereof with sound producing translation.

I claim:

1. In a pre-pay or subscription television system the combination of a sending station including means to emit video signals, and means to emit audio signals, and a receiver including means to receive and translate said video signals picture raster producing means, connections between the video signals receiving and translating means, and the picture raster producing means constituted to cause the picture raster producing means to produce a picture raster, and means to receive and translate said audio signals sound producing means, connections between the audio signals receiving and translating means, and the sound producing means constituted to cause the sound producing means to produce an intelligible audio translation, means to produce and emit a control signal, means to receive said control signal, the connections between the video signals receiving means and the picture raster producing means, including switch means having a first defined position and a second defined position, constituted to make ineffective the picture raster producing means when said switch means is in said first defined position and to make effective the picture raster producing means to produce a raster when said switch means is in its second defined position, the connections which includes the switch means including means for first defined switch position of the switch means when the control signal is being received, together with operator controlled means constituted to produce second defined switch position when the control signal is being translated.

2. A television system as defined in claim 1, wherein the operator controlled means comprises a pre-pay unit.

3. A television system as defined in claim 1, wherein the operator controlled means comprises a remote control unit.

4. A television system as defined in claim 1, wherein the control signal comprises a super-sonic frequency signal, and the means which receive the control signal comprises an oscillator tuned to the frequency of the control signal and responsive to that frequency, and wherein the switch means connections include means responsive to the oscillator at the response frequency thereof, and connections between said response means and the switch means constituted to cause the switch means to be in its first defined position, when the response means responds to the frequency of the received control signal.

5. A television system as defined in claim 4, wherein the operator controlled means includes means which is constituted to make ineffective responsive means and the switch means.

6. In a television receiver of the plural color dot array and the plural electron gun type, means to receive signals which include a plurality of color components, electron guns corresponding to said color components, connections to deliver to each gun signal components for the color to which such gun corresponds to produce a raster in color; together with selector means and connections constituted to deliver to each gun all of the received video signals components, to produce the raster in monochrome.

7. A television receiver as defined in claim 5, wherein said selector means is adjustable to cause the raster to be produced either in color or in monochrome, selectively.

8. A television receiver as defined in claim 7, wherein said selector means comprises a pre-pay device.

9. A television receiver as defined in claim 8, wherein said selector means comprises a remote control device.

10. In a television receiver of the plural color and the plural electron gun type, which receiver includes means to receive video signals including components corresponding to a plurality of colors, and means and connections from the video signal receiving means to the guns constituted to deliver to the guns, the color components corresponding to such guns, for production of a raster in color; that improvement which consists in the provision of means and connections constituted to deliver to each gun, simultaneously, signals corresponding to all of the color components, to thereby produce a raster in monochrome.

11. A television receiver as defined in claim 10, wherein the means and connections constituted to deliver to each gun, signals corresponding to all of the color components, comprises a selector means constituted for delivery to the guns the color components corresponding to said guns, or for simultaneous delivery to each gun, signals corresponding to all of the color components, selectively.

References Cited

UNITED STATES PATENTS

| | | | |
|---|---|---|---|
| 2,843,654 | 7/1958 | Gottfried et al. | 178—5.1 |
| 2,843,655 | 7/1958 | Gottfried et al. | 178—5.1 |
| 2,908,750 | 10/1959 | Heuer et al. | 178—5.4 |
| 2,918,522 | 12/1959 | Ridenour | 178—5.1 |

JOHN W. CALDWELL, *Acting Primary Examiner.*

J. A. O'BRIEN, *Assistant Examiner.*